Oct. 22, 1957 P. B. ANDERSON 2,810,605
DUMP FOR STONE GATHERING MACHINE
Filed Nov. 29, 1954 4 Sheets-Sheet 3
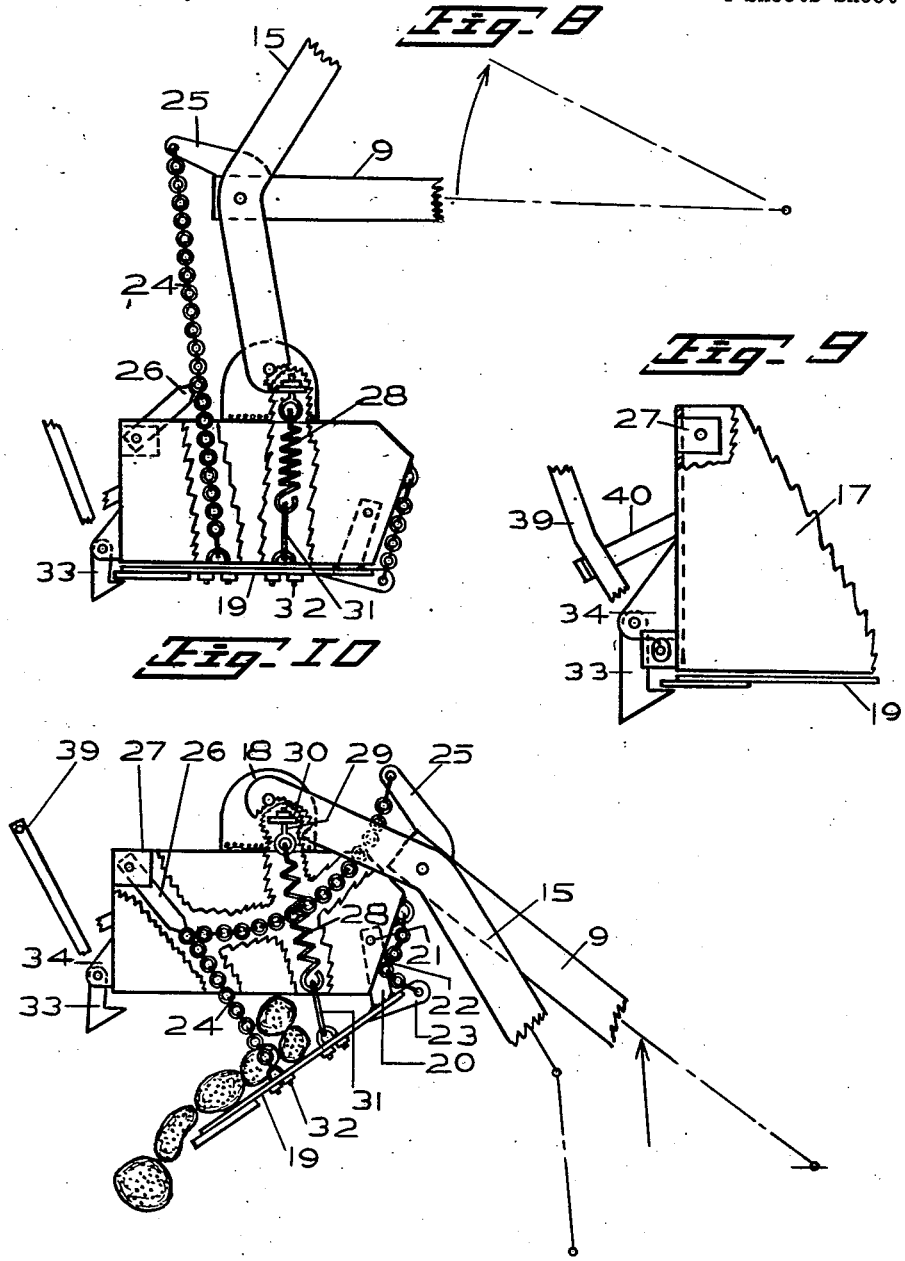
Inventor
Peter Britanius Anderson
Per L. S. Mitchell
Attorney Oct. 22, 1957 P. B. ANDERSON 2,810,605
DUMP FOR STONE GATHERING MACHINE
Filed Nov. 29, 1954 4 Sheets-Sheet 4
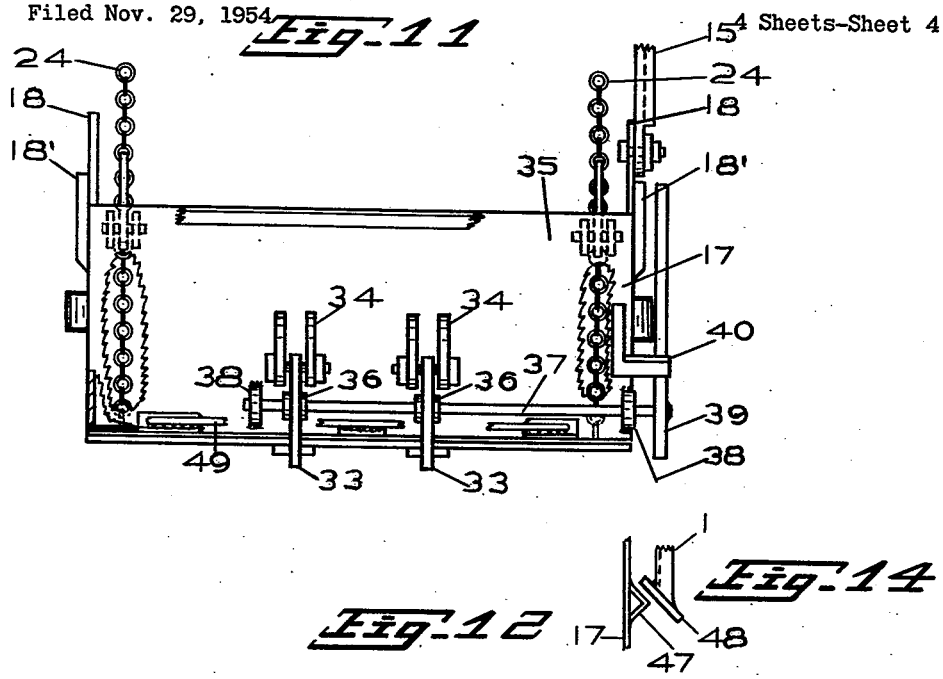
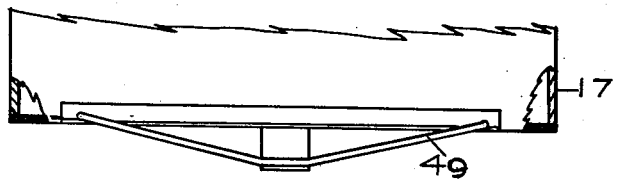
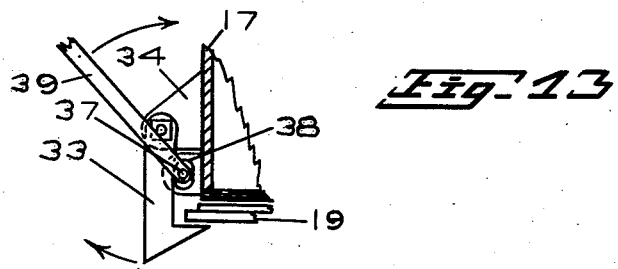
Inventor:
Peter Britanius Anderson
Per L. J. Mitchell
Attorney

United States Patent Office 2,810,605
Patented Oct. 22, 1957

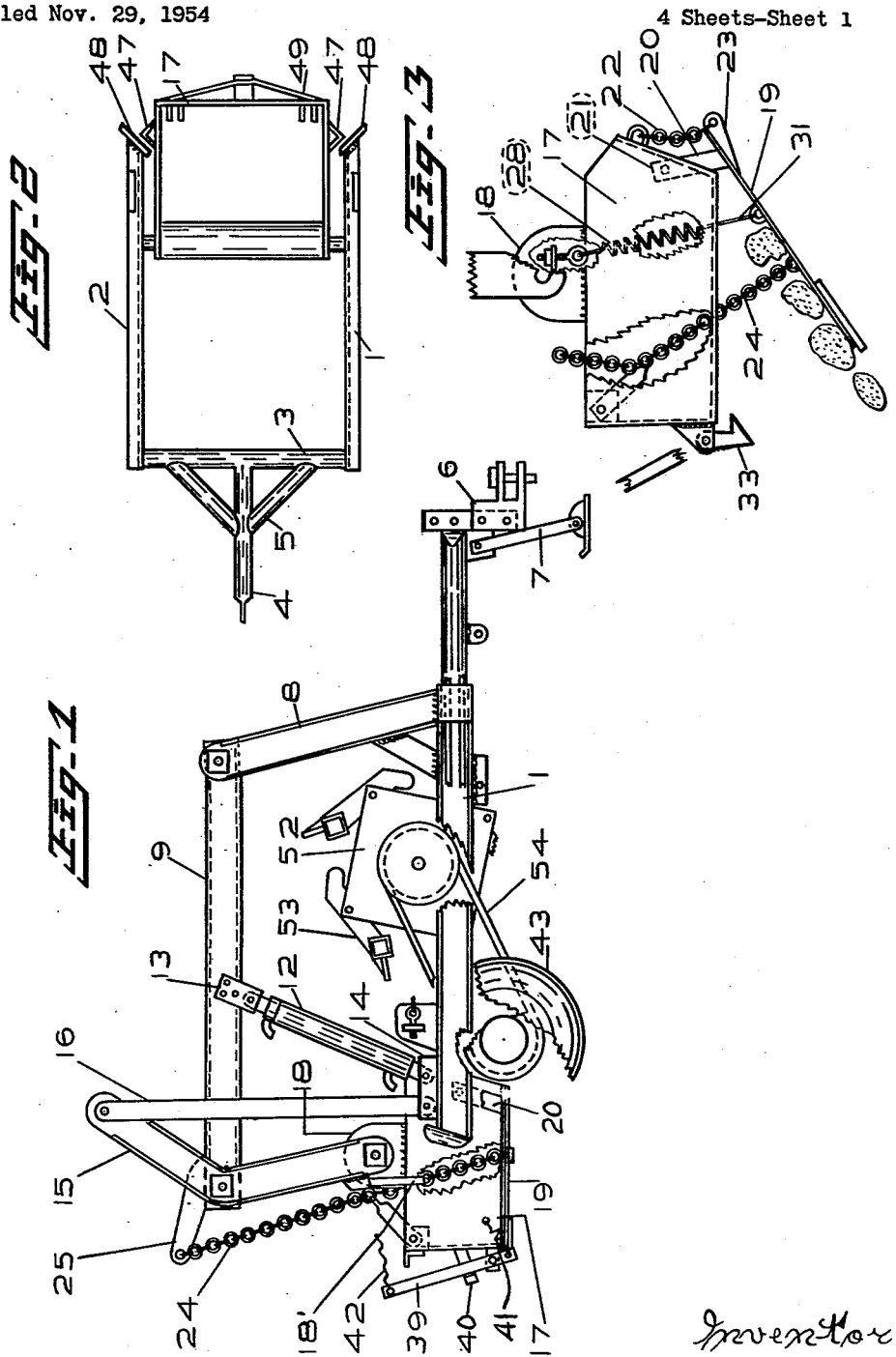
Oct. 22, 1957  P. B. ANDERSON  2,810,605
DUMP FOR STONE GATHERING MACHINE
Filed Nov. 29, 1954  4 Sheets-Sheet 1
Inventor
Peter Butanius Anderson
Per L. S. Mitchell
Attorney

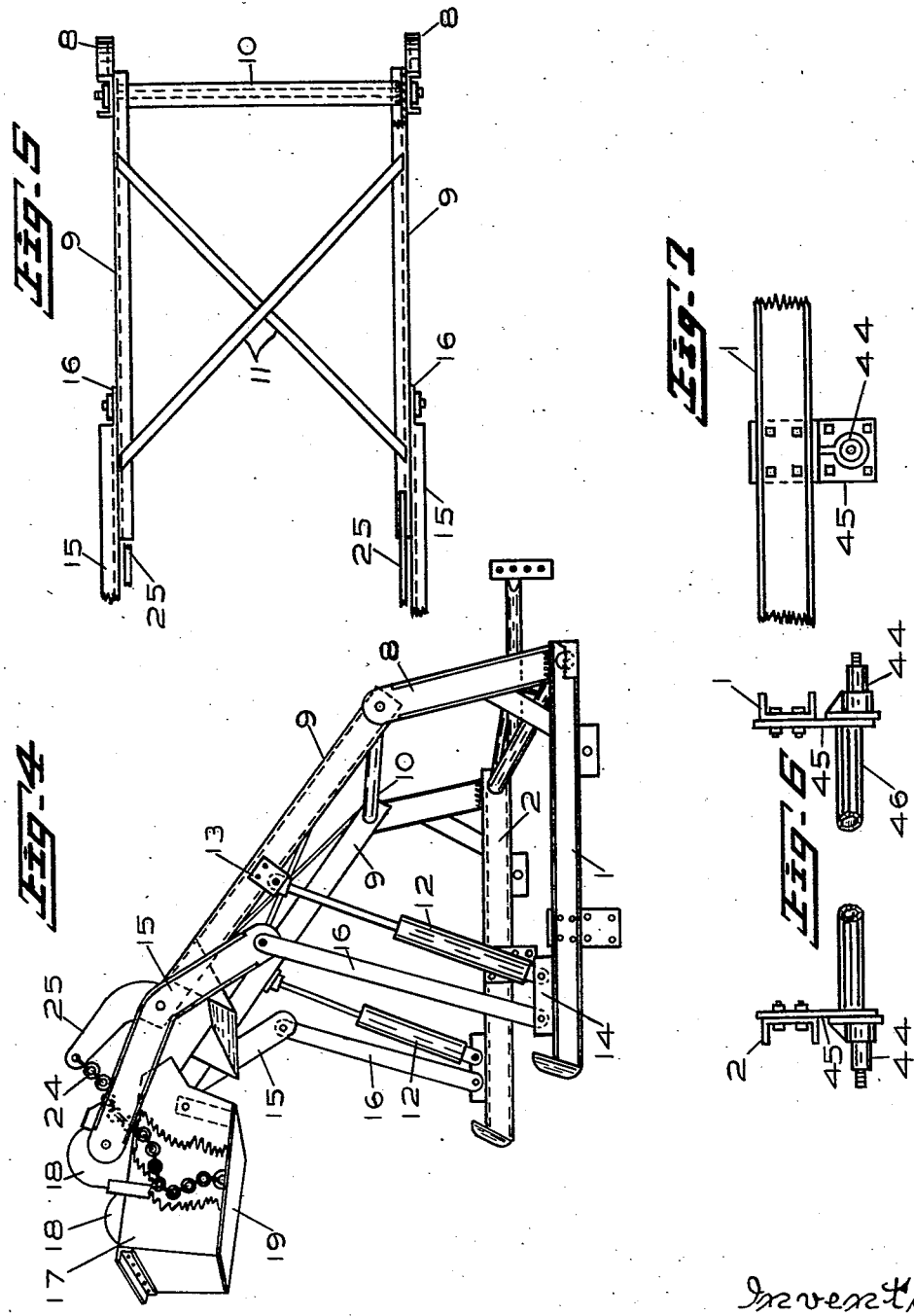

2,810,605

DUMP FOR STONE GATHERING MACHINE

Peter Britanius Anderson, Southey, Saskatchewan, Canada

Application November 29, 1954, Serial No. 471,761

3 Claims. (Cl. 298—27)

My invention relates to stone gathering machines, having reference to an improved bucket and dump for the gathered stones.

In the art to which the invention relates various types of buckets and dumps for the buckets have been proposed in machines for gathering stones from agricultural lands and the present invention is concerned with an improved bucket and dump for such machines.

The device herein disclosed forms part of a machine in which a stone gathering apron or the like is employed adapted for travel along the ground to pick up stones off agricultural land and including mechanism for moving the stones rearward and depositing them in a bucket for dumping as required. The present invention is limited to the bucket and dump mechanism of such a machine, the other parts of which form the subject matter of co-pending applications under Serial Numbers 476,714 and 467,822.

One of the objects of this invention is to provide an improved bucket and dump for stone gathering machines in which the bucket is suspended at a low level for receiving the gathered stones and is adapted thereby to minimize load sway, and is capable of elevation to a relatively high level for dumping the gathered stones, and further in which suspension of the bucket is from above and is adapted to maintain the balance of the loaded bucket during elevation for dumping.

A further object of the invention is to provide an improved discharge for the bucket designed to slide the load rearwardly to facilitate piling.

A still further object of the invention is to provide a bucket elevating mechanism by which as the bucket is elevated it travels rearwardly, leading the machine away from the rock pile, or making it easy unloading into a truck or wagon.

A still further object of the invention is to provide a short, compact machine capable of standing abuse under severe stone gathering conditions.

Other features and advantages of the invention will become apparent by reference to the accompanying description taken in conjunction with the drawings wherein:

Fig. 1 is a side view of a device embodying my improvements, shown with the bucket lowered in stone receiving position, and further shown partly broken away and with parts omitted for convenience of illustration.

Fig. 2 shows a top plan view of the main frame for the machine, including the draw bar and the bucket taken by itself.

Fig. 3 shows a side view of the bucket, shown partly broken away, and including a fragment of a suspending arm, the bucket being shown with the bottom released as in the stone dumping operation at a medium elevation.

Fig. 4 shows a side view in perspective of the bucket supporting frame, including the hydraulic lifts, shown with the bucket elevated and partly broken away.

Fig. 5 shows a top plan view, partly broken away, of the upper or elevating frame, and including the cross braces.

Fig. 6 shows a detail front view of the axles and mounts attaching the axles to the main frame, and including the tubular cross member shown broken away.

Fig. 7 shows an outer side view of a fragment of a main frame side bar with axle mounted thereon.

Fig. 8 shows a side view of the bucket partly broken away, with fragment of a bucket elevating arm and angle arm, shown with the bottom of the bucket closed.

Fig. 9 shows a fragment of the bucket, and including the catch members for the bucket bottom, and a fragment of the lever for disengaging the catch members.

Fig. 10 shows a side view of the bucket broken away and fragments of the elevating arm and angle arm, the bucket being shown with the bottom released as in high level dumping.

Fig. 11 shows a rear elevation of the bucket partly broken away, and including the cam arrangement for releasing the bucket bottom catch members, and further showing a fragment of a bucket supporting arm.

Fig. 12 shows a fragment of the bucket and reinforcing bridge member.

Fig. 13 shows detail fragments of a bucket guide and rest.

Fig. 14 shows a detail fragment of the bucket with side view of the catch member shown engaging the bucket bottom, a fragment of the catch member actuating lever being included.

Having reference to the drawings there is provided a main frame for the machine consisting of channel bar side members 1 and 2, and front tubular cross frame member 3. A draft bar 4 attaches to the cross frame member 3 and includes braces 5. The draft bar has a hitch connection 6 and front supporting leg 7 as is common in the art.

On the front end of the main frame are fixed upright frame bars 8 on which is carried an elevating frame formed of channel side bars 9 pivoted on the bars 8 and with a tubular cross member 10, and to which cross brace members 11 could be added as in Figure 5.

The elevating frame is supported to be raised by hydraulic lifts 12 pivotally attaching by brackets 13 to the elevating frame bars 9 and by bracket plates 14 to the main frame side bars 1 and 2. A source of supply of fluid under pressure would be provided for these lifts.

Intermediately pivoting on the free ends of arms 9 are angle arms 15 having their one ends anchored by pivotally connected links 16 to the bracket plates 14 on the main frame bars 1 and 2. On the outer ends of these angle arms 15 is supported a bucket 17 by means of integral lugs 18 thereon and to which the angle arms 15 pivotally attach.

This bucket provides a bottom consisting of a plate 19 supported to swing rearwardly on arms 20 fixed thereto and pivoting to the bucket 17 as at 21. Chains 22 secured to the bucket and to ears 23 on the bottom plate 19 limit forward movement of the bottom plate 19 to permit it to swing into closing relation to the bucket.

The bottom plate 19 is intermediately supported at its outer ends by chains 24 fixed thereto and to arms 25 carried on the frame elevating bars 9. These chains are intermediately engaged by arms 26 pivoted to bucket plates 27 on the bucket and are designed to limit downward movement of the bottom plate 19, as shown in Figures 3 and 10.

The bottom plate 19 is further supported by springs 28 engaging eye bolts 29 attached by ears 30 to the bucket supporting lugs 18 and by links 31 engaging U-bolts 32 secured to the bottom 19. The springs 28 normally hold the bottom 19 closed and are tensioned by the opening of the bottom. They serve to ease the jar to the bottom in the opening operation and to prevent buckling, and further aid in closing the bottom when the load has been discharged.

For securing the bottom in closing relation to the bucket, catch members 33 are provided pivoting in brackets 34 fixed to the rear wall 35 of the hopper. These catch members gravitate into engaging relation with the bucket bottom plate 19 and may be released by cams 36 on a shaft 37 mounted to turn in lugs 38 on the bucket wall 35. The shaft 37 is adapted to be turned by a lever 39 fixed thereto and limited as to turning movement by a bracket arm 40, the lever being normally held by a spring 41 with the catch members free to engage the bottom 19 of the bucket. The lever 39 includes a cable 42 to extend for actuation from the seat of a tractor by which the stone gathering machine of which this forms a part is drawn.

For supporting the machine, wheels as at 43 would be provided mounted on stub axles 44 (Fig. 6) carried by plates 45 secured to the main frame side bars 1 and 2, a tubular brace member 46 being included between the axles secured to the plates 45.

There are further provided guides 47 on the lower outside front end of the bucket, one to each side, adapted to bear against rests 48 on frame bars 1 and 2.

In the operation of the machine gathered stones would be delivered to the bucket with said bucket in loading position, as in Figure 1, by mechanism not included in the present showing and then by delivery of fluid under pressure to the lifts 12 the arms 9 are raised pivoting on the bars 8. This in turn has the effect of raising the outer ends of arms 15, the links 16 anchoring said arms, and the arms 15 raise the bucket 17. The bucket may be dumped intermediately, as in Figure 3, or at the upper limit of its movement, as in Figure 10. This is done by the operator drawing on the cable 42 on lever 39 to release the catch members 33 for the bottom 19. The bottom then drops, cushioned by springs 28 and limited as to the drop by the chains 24 and arms 26. When the bucket is lowered by downward movement of the arms 9 the chains draw the bucket bottom closed, as in Figure 8, assisted by the springs 28.

In Figure 1 is shown parts 52 and 53 of a reel with drive 54 from the wheels 43, this forming no part of the present invention.

Having thus particularly described and ascertained the nature of my said invention, what I claim and wish to secure by Letters Patent is:

1. In a stone gathering machine including a main frame, a pair of upright frame bars mounted spaced apart on said frame, a pair of elevating arms each pivoted at one end to a frame bar, a pair of angle arms each formed with two arm portions and a connecting bend, means pivotally mounting the angle arms at the bends thereof on the other ends of the elevating arms, a pair of links each having an end pivotally connected to the end of one arm portion of an angle arm and the other end anchored to the main frame, a stone carrying bucket suspended from the other ends of said angle arms, and hydraulic lift means for the elevating arms.

2. A device as defined in claim 1 in which the bucket includes a bottom plate pivoted to open downward, catch members adapted to automatically engage the bottom plate when said plate is in closing relation to the bucket, a manually operable release for said catch members, chains suspended from the elevating arms engaging the bottom plate of the bucket and adapted to draw the bottom plate into closing relation to the bucket when the bucket is lowered, and pivotally mounted arms on the bucket intermediately engaging said chains and adapted to limit the downward opening movement of the bottom plate.

3. A device as defined in claim 2 in which arms pivotally support one end of the bottom plate with said plate free to swing downward and backward, a chain limiting forward movement of the bottom plate adapted when the plate swings forward to bring it into seated relation to the bottom of the bucket, and springs on the bucket engaging the bottom plate and opposing downward movement of said plate.

References Cited in the file of this patent

UNITED STATES PATENTS

| | | |
|---|---|---|
| 1,617,743 | Barnes | Feb. 15, 1927 |
| 2,199,520 | Dempster | May 7, 1940 |
| 2,470,147 | Cramer | May 17, 1949 |
| 2,621,817 | McNamara | Dec. 16, 1952 |

FOREIGN PATENTS

| | | |
|---|---|---|
| 483,501 | Canada | May 27, 1952 |